United States Patent [19]

Kehoe et al.

[11] Patent Number: 5,324,530
[45] Date of Patent: Jun. 28, 1994

[54] APPARATUS AND METHOD FOR MAKING EXTRUDED CHEWING GUM

[75] Inventors: Gary Kehoe, Scarborough, N.Y.;
John Zimmerman, Clemmons, N.C.;
Thomas Carroll, Oak Ridge, N.J.;
Michael Diehl, Jenison, Mich.

[73] Assignee: Nabisco, Inc., Parsippany, N.J.

[21] Appl. No.: 66,677

[22] Filed: May 24, 1993

[51] Int. Cl.$^5$ .................. A23G 7/00; A23P 1/00; B29B 7/00
[52] U.S. Cl. .................. 426/516; 366/85; 366/90; 425/204; 425/205; 425/209; 426/5
[58] Field of Search .................. 426/3, 5, 516, 519; 425/204, 205, 209; 366/85, 90; 264/176.1

[56] References Cited

U.S. PATENT DOCUMENTS

| | | | |
|---|---|---|---|
| 4,599,002 | 7/1986 | Gutknecht | 425/204 |
| 4,900,156 | 2/1990 | Bauer | 425/204 |
| 4,940,594 | 7/1990 | Van Alstine | 426/516 |
| 5,045,326 | 9/1991 | Glass et al. | 426/516 |
| 5,135,760 | 8/1992 | Degady et al. | 426/516 |
| 5,262,190 | 11/1993 | Cunningham et al. | 426/516 |

Primary Examiner—George Yeung

[57] ABSTRACT

Material such as chewing gum is treated to reduce its density by working it and feeding it through a twin-screw corotating extruder configured to provide flow at first and second longitudinal rates, pulling in a plane normal to the axis of flow, and further working and homogenization.

12 Claims, 1 Drawing Sheet

APPARATUS AND METHOD FOR MAKING EXTRUDED CHEWING GUM

BACKGROUND OF THE INVENTION

The present invention relates to the production of aerated material, especially chewing gum. By "aerated" is meant that the density of the material is reduced by the designed introduction of air, or one or a mixture of specific gases. The material can be any which is continuous and extrudible, such as gums and taffy.

Since such materials tend to be relatively viscous, the aeration of the material is not straightforward. It is all too easy to form voids in the product which render the product unsightly or otherwise of unacceptable aesthetic and/or performance characteristics. In addition, if the aeration forms voids which appear at the surface and break open, the desired reduction in density is prevented from occurring.

Attempts have been made in the past to aerate gums, as typified by U.S. Pat. No. 4,491,596 and U.S. Pat. No. 5,045,326. Such attempts have lacked the reliability, versatility and simplicity of the techniques described herein which comprise the present invention. Past attempts have been made as well to utilize twin screw extruders in the production of chewing gum, as indicated in U.S. Pat. No. 5,135,760, but such attempts have failed to recognize the effectiveness of properly equipped extruders in the reduction of gum density. Other patents disclosing modifications to twin screw extruders, such as U.S. Pat. No. 4,900,156 and U.S. Pat. No. 4,599,002, have not recognized or suggested the advantages available in the techniques of the present invention, and indeed have not described the production of chewing gums.

BRIEF SUMMARY OF THE INVENTION

One aspect of the invention is a continuous method for treating food material to reduce its density, comprising (a) working the material wherein it is aerated and softened;

(b) extruding the worked material through a first longitudinal zone of a twin screw corotating extruder at a first longitudinal rate;

(c) extruding the material from said first zone through a second longitudinal zone of said extruder at a longitudinal rate higher than said first rate, wherein said material is stretched and aerated;

(d) subjecting the material from said second zone to pulling action in a plane normal to the longitudinal axis which action is effective to homogeneously aerate said material without shearing said material;

(e) extruding said pulled material through a third zone of said extruder wherein said material is worked and homogenized; and (f) extruding said material through a fourth zone of said extruder and from said fourth zone out of said extruder at a longitudinal rate equal to said first longitudinal rate.

Another aspect of the invention is an apparatus for treating food material to reduce its density, comprising (a) extruding means comprising a twin screw co-rotating extruder comprising (i) a first longitudinal extruding means for extruding said material at a first longitudinal rate;

(ii) second longitudinal extruding means in communication with said first extruding means, for extruding said material at a second longitudinal rate which is higher than said first longitudinal rate;

(iii) pulling means, in communication with said second extruding means, for pulling said material in a plane normal to the longitudinal axis of said second extruding means, said pulling being effective to homogeneously aerate said material without shearing said material;

(iv) third longitudinal extruding means, in communication with said pulling means, for removing said material from said pulling means, and working and homogenizing said material; and (v) fourth longitudinal extruding means, in communication with said third extruding means, for extruding said material from said extruder at a rate equal to said first longitudinal rate; and (b) feed means in communication with said first longitudinal extruding means, for working material and feeding it to said first longitudinal extruding means, wherein the virtual mass flow rate of said feed means exceeds its actual mass flow rate.

DETAILED DESCRIPTION OF THE INVENTION

The present invention is particularly suitable for treating chewing gum, and in particular bubble gum. However, it will be appreciated that the present invention is also useful for treating other extrudible solids, including other food products such as taffy or dough as well as other non-edible products such as polymer blends and in particular elastomeric polymer blends. The invention will be described further below with reference to the particularly preferred embodiment thereof, in which the material being processed is bubble gum.

Figure 1:
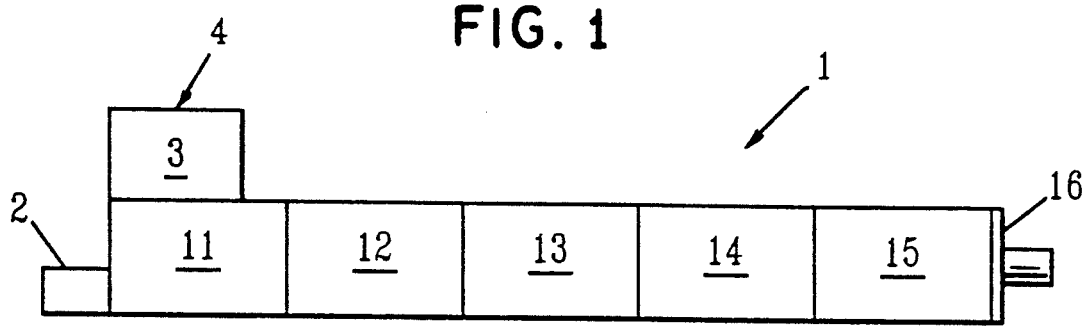
FIG. 1 is a schematic side view of apparatus in accordance with the present invention.

Referring first to FIG. 1, the preferred apparatus in which the present invention is carried out is a twin screw co-rotating extruder 1. The extruder 1 preferably comprises screw elements mounted on parallel longitudinal shafts, as described further herein, in a housing typically provided with a removable cover to facilitate changing the screw elements, clearing blockages, and so forth as known in this field. The shafts are driven by drive means 2 which can be any suitable motor connected to the shafts through gearing as is well known in this art. The shafts are mounted and connected so that they both rotate clockwise, or both rotate counterclockwise. Feed means 3 has a top opening 4 through which material to be processed by the apparatus is fed manually by the operator, or automatically. Feed means 3 also has a bottom exit opening 5 which communicates with one end of the extruder 1, at zone 11 thereof.

Figure 2:
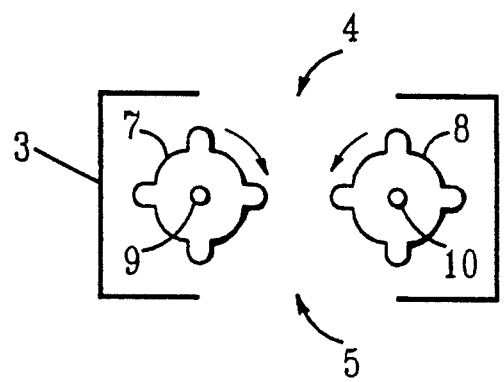
FIG. 2 is a cross-sectional view of the feed means which is one part of the apparatus shown in FIG. 1.

FIG. 2 depicts in schematic cross-section a preferred embodiment of feed means 3. The feed means preferably comprises a structure resembling a box or cylinder having sides but being open at the top 4 and the bottom 5. A pair of feed element means 7 and 8 disposed within the feed means are mounted on parallel shafts 9 and 10 which are in turn mounted within the means 4. The shafts 9 and 10 are connected by suitable gear means to a drive means (not shown) such as a suitably powered electric motor, such that one of feed element means 7 and 8 rotates clockwise and the other means rotates counterclockwise, so that material between them is urged downward. The feed element means 7 and 8, which are preferably wheels or cylinders, are configured to satisfy the objective of pulling the gum or other material downward towards opening 5, urging it against the first set of screw elements in extruder 1. That configuration can take the form of ribbing parallel to the shafts 9 and 10, spaced-apart teeth or other protuberances, or other irregular surface elements capable of physically and/or frictionally engaging the material and urging it downward.

It is one desired aspect of the present invention that feed means 3 supplies the gum or other material to the screw elements at the inlet of extruder 1 at an effective rate greater than the rate at which those screw elements can take the gum away from the exit opening 5 of feed means 3. That is, the "virtual mass flow rate" of the feed means, which as used herein means the mass flow rate of material by the feed means 3 if the exit opening 5 were completely unconfined, will in operation exceed the "actual mass flow rate" of the feed means, which as used herein means the mass flow rate at which material actually exits through opening 5 and enters zone 11 of the extruder. Therefore, the feed elements 7 and 8 should be of a configuration that provides the effective pulling and urging action to the gum but also permits some slippage of the elements against the gum, thereby advantageously working the gum to soften it and partially aerate it. Preferably, the rate of revolution of the elements 7 and 8 is adjustable, as is the distance between the elements 7 and 8. The elements should not be of a design that cuts, chops, or shears the gum.

Referring again to FIG. 1, the extruder used in the present invention is depicted schematically as a series of zones within the twin screw co-rotating extruder. It should be recognized that the "zones" are referred to herein solely for ease of description. In practice, there is no physical delimitation between zones, and material flows smoothly from one "zone" to the next. As noted, the extruder comprises a pair of parallel shafts to which are affixed a series of different elements carefully chosen in characteristics and sequence to provide the desired density reduction to material passing through the extruder. While each shaft can be as one cast or forged unit integral with the screw-type elements, it is preferable and customary to provide that each of the two shafts is a separate device which carries the various screw element means removably affixed thereon. For instance, each screw element means is provided with a hollow center which is slid onto the shaft whereupon the element is releasably bolted or otherwise fastened to the shaft such that rotation of the shaft also rotates the elements. The details of how any particular element can be assembled to the shaft such that the finished apparatus rotates as desired will be familiar to those of ordinary skill in this art. The elements are sized, and the two parallel shafts are positioned with respect to each other, such that the protruding edges of the screw elements on each shaft intermesh; that is, when the apparatus has been assembled the radius of each screw element from the center line of the shaft to the furthest edge of the element is greater than half the distance between the two shafts. This mode of construction, too, is familiar to those of ordinary skill in this art. The screw elements are all configured to extrude material in the same direction (for instance, all are "right-handed"), except as specified otherwise herein.

In the apparatus of the present invention, the extruder includes a first longitudinal zone 11. This zone is open at the top to receive material fed to zone 11 by feed means 3 through opening 5. Zone 11 comprises a pair of intermeshing screw element means configured to conduct material fed into zone 11 longitudinally away from opening 5, at a first longitudinal rate of flow. While the precise dimensions of the screw elements in zone 11 are not critical, a useful size is that known as "40/40", by which is meant an element 40 mm long configured such that 1 complete rotation of the element carries the material being extruded through a distance of 40 mm. The length of zone 11 should be sufficient to ensure that the material emerging from zone 11 is essentially homogeneous. The first zone can be on the order of 160 mm in length.

First zone 11 feeds material directly into second longitudinal extruding zone 12, which comprises a parallel pair of intermeshing screw element means configured to extrude the material longitudinally at a second longitudinal rate greater than and preferably substantially greater than, the first longitudinal rate at which the material is extruded through the first zone 11.

The desired effect is that second zone 12 effectively pulls the material away from the end of zone 11 faster than zone 11 feeds it to zone 12, whereby the material is stretched longitudinally and is aerated. The longitudinal rate at which material is extruded through zone 12 is preferably 1.25 to 5 times the first longitudinal rate, provided that the difference in rates is not so high for the given material that the material is sheared or severed. A ratio of the second to the first longitudinal feed rates of about 2:1 is preferred. The length of zone 12 is not critical but should be sufficient to insure that all the feed material undergoes the desired longitudinal pulling and, having been pulled, is essentially uniformly and homogeneously pulled and aerated. For instance, zone 12 can be about 240 mm in length.

Figure 3:
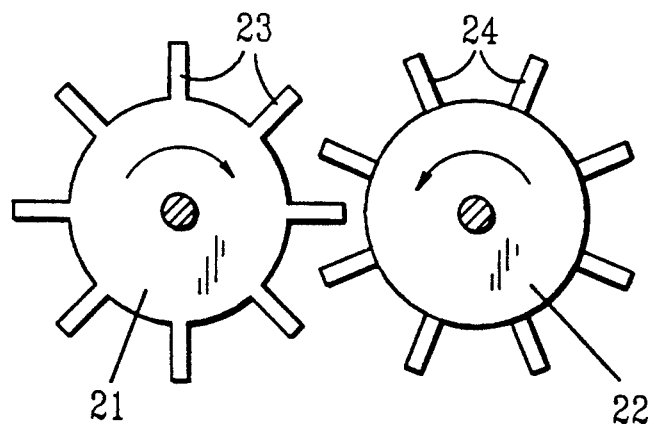
FIG. 3 is a front plan view of a pair of plate elements which constitute part of the apparatus of the present invention.
Figure 4:
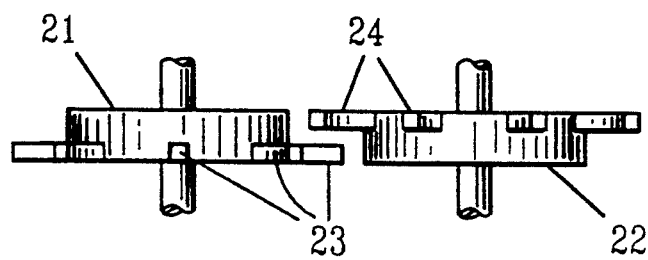
FIG. 4 is a top plan view of the plates shown in FIG. 3.

Zone 12 feeds material to zone 13 whose function is subjecting the material to pulling action in a plane normal to the longitudinal direction of flow of the material in the preceding zone 12. The desired pulling action is effective to provide further, homogeneous aeration to the material, but should not impart additional shear to the material beyond that which normally inheres in the movement imparted to the material by the screw elements. Referring to FIGS. 3 and 4, zone 13 preferably contains a pair of plates denoted as 21 and 22, which are mounted on the parallel shafts of the extruder so as to lie in a plane perpendicular to the shafts. The material is fed through the space between the plates 21 and 22. Protruding radially from each of plates 21 and 22 is a plurality of pin means 23 and 24. Preferably 4 to 12 cylindrical pin means are provided on each plate; more preferably about 8 pins per plate are provided. As shown in FIG. 4, the plates 21 and 22 are in substantially side-by-side relation within the extruder. Each of pins 23 and 24 extends nearly the entire distance from the edge of the plate to which the pin is attached to the other plate. As seen in FIG. 4, pins 23 and 24 are offset from each other, such that pins 23 extend from the edge of plate 21 adjacent the front surface of plate 21, whereas the pins 24 extend from the edge of plate 22 adjacent the rear surface of plate 22. Thus, as the pins 23 and 24 pass each other they do not lie in the same plane and do not contact each other. It will be noted that, since both plates are rotating in the same direction, that is, both clockwise or both counter clockwise, the pins 23 and 24 pass each other in the space between plates 21 and 22 in opposite directions; that is, the pins on one plate proceed "upwards" while the pins on the other plate proceed "downwards". This coaction of the pins provides stretching and pulling of the material along an axis essentially normal to the longitudinal axis along which the material is extruded from zone 12. The space between plates 21 and 22 should be appropriately sized so that the material being treated passes therebetween at essentially the rate at which it is fed into zone 13 by extruder zone 12.

If desired, two or three sets of plates 21 and 22 can be provided in series so that the material is subjected to the pulling action several times.

Immediately downstream from zone 13 is longitudinal zone 14, which comprises another pair of screw-type extruding elements configured to pull the material from zone 13 into zone 14 and to longitudinally pull it, thereby further aerating the material. Zone 14 also includes an element which kneads and homogenizes the thus aerated material, thereby helping to eliminate any residual air voids in the material that would be noticeable to the naked eye. A preferred means for accomplishing this is a reverse-threaded screw element, that is, one whose threads are in the direction opposite to that of the screw elements in, for instance, the first and second longitudinal zones. For instance, the reverse-threaded element has "left-handed" threads if the other screw-type extruding elements in the apparatus are "right-handed".

Zone 14 feeds material to extruding zone 15, which comprises a pair of screw-type extruding elements configured such that the longitudinal rate of flow of material through zone 15 is equal to the first longitudinal rate at which the material is extruded through zone 11. The outlet of zone 15 is provided with a standard extrusion plate 16, having an orifice whose dimensions are on the order of 1¾ inch to ¾ inch, which assists in providing back pressure and provides for a uniform rate of flow of reduced-density material from the extruder.

Following extrusion, the material can be treated in any conventional fashion. Preferably, the material can simply be cut and/or otherwise shaped into the desired final form for sale, cooled if necessary, and packaged. Alternatively, the material can be further worked or shaped to reduce its size, for instance by pressing it into sheets and/or cutting it into sticks, although it will be recognized that any such compression or flattening may somewhat increase the density of the product and risk sacrifice of some of the desired effect produced by the apparatus described herein.

The elements described above for the extrusion and working apparatus can all be fabricated from stainless steel. The apparatus is preferably provided with means, such as water jacketing, to control the temperature of the material during treatment. For chewing gum formulations, the temperature of the gum fed into feed means 3 is preferably on the order of 80°–100° F., and the gum is preferably maintained at about 100°–108° F. along the length of the extruder itself. It will be recognized that temperatures which are too high or too low can interfere with the processability of the material and with the desired characteristics of the final product.

It is one advantage of the present invention that the sequence of zones described herein provides desirable adaptability to the task of density reduction, thereby permitting treatment of a variety of feed materials with minimal need to alter the configuration of the apparatus. Without intending to indicate a binding limit to the production rates, it is useful to realize that satisfactory operation can be attained at flow rates of material ranging between about 120 pounds per hour up to about 400 pounds per hour, by adjusting the speed of rotation of the elements in the extruder between about 30 rpm for the lower flow rates up to about 100 rpm for the higher flow rate. Flow rates above about 100 rpm run the risk of excessively softening the material upon its emergence from the dieplate.

With the presently described invention, it has been found possible to reduce the density of chewing gum formulations from about 1.35 (g/cc) to about 1.18–1.22. Thus, a density reduction of over about 5%, and even up to about 10% or more, has been achieved without the need for special aerating or air injecting equipment. The invention is thus highly advantageous in that it avoids the need to provide special gas injection equipment, and eliminates the necessity of monitoring the gas source and periodically maintaining or replacing gas supplies. The present invention is also considered to represent a particularly unexpected development in the processing of such material, particularly in that twin-screw extruders are conventionally employed for homogenization and densification. Thus, adapting such a device to intentionally aerate material represents a departure from conventional practice which is all the more noteworthy in view of the exemplary results that have been obtained with the invention.

The invention will be illustrated further in the following example:

EXAMPLE

The following screw elements were assembled onto each of the two shafts of a twin-screw corotating extruder (all were right-handed threaded except where indicated otherwise): four 40/40 elements; three 80/80 elements; a pin plate having 8 uniformly spaced pins radially extending from the edge of the plate (the pins on each plate interacting as shown in FIGS. 3 and 4); one 60/30; one 80/80; one 45/5/30 reverse pitch left-handed element; one 60/30; and one 40/40. The extruder was operated with a die plate having a 0.75 inch × 0.5 inch orifice, and again with a die plate having a ⅜-inch square opening. The extruder was water-jacketed and operated at 80° F. in the feed area and 100°–108° F. in the extruder itself.

This extruder was operated with a standard bubble gum formulation (initial density about 1.35 g/cc) at several feed rates. The gum was fed from a feeder which worked the gum being fed to the extruder, as the ratio of virtual feed rate to actual feed rate was about 1.25:1. The following table shows the densities of the gum products formed at various feed rates and revolution rates (RPM) of the extruder:

| Feed Rate | RPM | Final Density | % Density Reduction |
|---|---|---|---|
| 122 lb/hr | 30 | 1.22 | 10% |
| 210 lb/hr | 50 | 1.20 | 12% |
| 344 lb/hr | 75 | 1.22 | 10% |

-continued

| Feed Rate | RPM | Final Density | % Density Reduction |
|---|---|---|---|
| 400 lb/hr | 100 | 1.18 | 13% |

What is claimed is:

1. A continuous method for treating food material to reduce its density, comprising
   (a) working the material wherein it is aerated and softened;
   (b) extruding the worked material through a first longitudinal zone of a twin screw corotating extruder at a first longitudinal rate;
   (c) extruding the material from said first zone through a second longitudinal zone of said extruder at a second longitudinal rate higher than said first rate, wherein said material is stretched and aerated;
   (d) subjecting the material from said second zone to pulling action in a plane normal to the longitudinal axis which action is effective to homogeneously aerate said material without shearing said material;
   (e) extruding said pulled material through a third zone of said extruder wherein said material is worked and homogenized; and
   (f) extruding said material through a fourth zone of said extruder and from said fourth zone out of said extruder at a longitudinal rate equal to said first longitudinal rate.

2. A method according to claim 1 wherein said food material is chewing gum.

3. A method according to claim 2 wherein step (a) comprises mechanically urging said chewing gum into said first longitudinal zone at a mass flow rate greater than the mass flow rate at which said gum enters said first longitudinal zone.

4. A method according to claim 2 wherein the ratio of said second longitudinal rate to said first longitudinal rate is about 1.25:1 to about 5:1.

5. A method according to claim 2 wherein step (d) comprises passing said gum between a pair of plates which lie in a plane normal to the axis of flow of said gum, each plate comprising a plurality of pin means radially extending therefrom, the pin means extending from one plate lying in a plane parallel to the plane in which the pin means extending from the other plate lie, wherein the pin means extending from both plates cross the space between the plates; and rotating both of said plates clockwise or both counterclockwise.

6. A method according to claim 2 wherein said gum is worked and homogenized in step (e) by passing it through a zone of said extruder equipped with a reverse-threaded screw element.

7. A method according to claim 2 wherein the density of said gum is reduced by at least about 5%.

8. A method according to claim 2 wherein the density of said gum is reduced by at least about 10%.

9. An apparatus for treating food material to reduce its density, comprising
   (a) extruding means comprising a twin screw co-rotating extruder comprising
      (i) a first longitudinal extruding means for extruding said material at a first longitudinal rate;
      (ii) second longitudinal extruding means in communication with said first extruding means, for extruding said material at a second longitudinal rate which is higher than said first longitudinal rate;
      (iii) pulling means, in communication with said second extruding means, for pulling said material in a plane normal to the longitudinal axis of said second extruding means, said pulling being effective to homogeneously aerate said material without shearing said material;
      (iv) third longitudinal extruding means, in communication with said pulling means, for removing said material from said pulling means, and working and homogenizing said material; and
      (v) fourth longitudinal extruding means, in communication with said third extruding means, for extruding said material from said extruder at a rate equal to said first longitudinal rate; and
   (b) feed means in communication with said first longitudinal extruding means, for working material and feeding it to said first longitudinal extruding means, wherein the virtual mass flow rate of said feed means exceeds its actual mass flow rate.

10. An apparatus according to claim 9 wherein the ratio of said second longitudinal rate to said first longitudinal rate is about 1.25:1 to about 5:1.

11. An apparatus according to claim 9 wherein said pulling means comprises a pair of plates which lie in a plane normal to the longitudinal axis of said extruder, each plate comprising a plurality of pin means extending radially therefrom, the pin means extending from one plate lying in a plane parallel to the plane in which the pin means extending from the other plate lie, wherein the pin means extending from both plates cross the space between the plates; and means for rotating said plates both clockwise or both counterclockwise.

12. An apparatus according to claim 9 wherein said third longitudinal extruding means comprises a reverse-threaded screw element.

* * * * *